(12) United States Patent
Walker et al.

(10) Patent No.: US 8,171,842 B2
(45) Date of Patent: May 8, 2012

(54) TWO-PIECE TWIST LOCK PISTON

(75) Inventors: Steve Walker, Talbott, TN (US); Philip Vaden, Strawberry Plains, TN (US)

(73) Assignee: Mahle International GmbH (DE)

( * ) Notice: Subject to any disclaimer, the term of this patent is extended or adjusted under 35 U.S.C. 154(b) by 930 days.

(21) Appl. No.: 12/136,592

(22) Filed: Jun. 10, 2008

(65) Prior Publication Data

US 2008/0314240 A1    Dec. 25, 2008

Related U.S. Application Data

(60) Provisional application No. 60/945,257, filed on Jun. 20, 2007.

(51) Int. Cl.
    *F16J 1/04*    (2006.01)
(52) U.S. Cl. .......................................... 92/218
(58) Field of Classification Search ................... 92/217, 92/218
    See application file for complete search history.

(56) References Cited

U.S. PATENT DOCUMENTS

| | | | | |
|---|---|---|---|---|
| 1,472,893 A | * | 11/1923 | Tismer | 92/218 |
| 1,530,383 A | * | 3/1925 | Livingood | 92/218 |
| 2,159,989 A | * | 5/1939 | Hazen et al. | 92/218 |
| 4,343,229 A | | 8/1982 | Tsuzuki et al. | |
| 4,419,925 A | | 12/1983 | Tsuzuki et al. | |

FOREIGN PATENT DOCUMENTS

| | | |
|---|---|---|
| DE | 2923934 | 12/1979 |
| DE | 4203384 | 8/1993 |
| DE | 4308751 | 9/1994 |
| DE | 19815989 | 10/1999 |
| DE | 10042422 | 4/2002 |
| DE | 10116084 | 10/2002 |

\* cited by examiner

*Primary Examiner* — Daniel Lopez (74) *Attorney, Agent, or Firm* — Rader, Fishman & Grauer PLLC (57) ABSTRACT

A piston includes a crown portion generally defining an axis and having a skirt connecting portion. The skirt connecting portion is defined, at least in part, by a first crown mating portion, a second crown mating portion positioned radially from the first crown mating portion, and a crown chamber surface extending between the first crown mating portion and the second crown mating portion. The piston also includes a skirt having a crown connecting portion. The crown connecting portion is defined, at least in part, by a first skirt mating portion, a second skirt mating portion, and a skirt chamber surface extending between the first skirt mating portion and the second skirt mating portion. The first crown mating portion is selectively coupled to the first skirt mating portion. The second crown mating portion is selectively coupled to the second skirt mating portion to define a piston chamber that is defined, at least in part, by the crown chamber surface and the skirt chamber surface.

18 Claims, 13 Drawing Sheets

TWO-PIECE TWIST LOCK PISTON

CROSS REFERENCE TO RELATED APPLICATIONS

This application claims priority to U.S. Provisional Patent Application 60/945,257 filed Jun. 20, 2007, the disclosure of which is incorporated by reference in its entirety.

TECHNICAL FIELD

The disclosure generally relates to reciprocating multi-piece pistons.

BACKGROUND

With continuing efforts to produce internal combustion engines with increased efficiency, pressures and temperatures have increased within the combustion chamber. These increases in pressure and temperature may require differing materials and construction methods for pistons.

Many pistons are assembled from a crown portion and a skirt portion. The crown is typically made of a cast or forged steel while the skirt is typically made of a lighter material, such as aluminum. Coupling the crown to the skirt may be accomplished in a variety of ways, including using the wrist pin attached to both the skirt and the crown while attached to the rod, friction welding, and threaded connections.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figure 1:
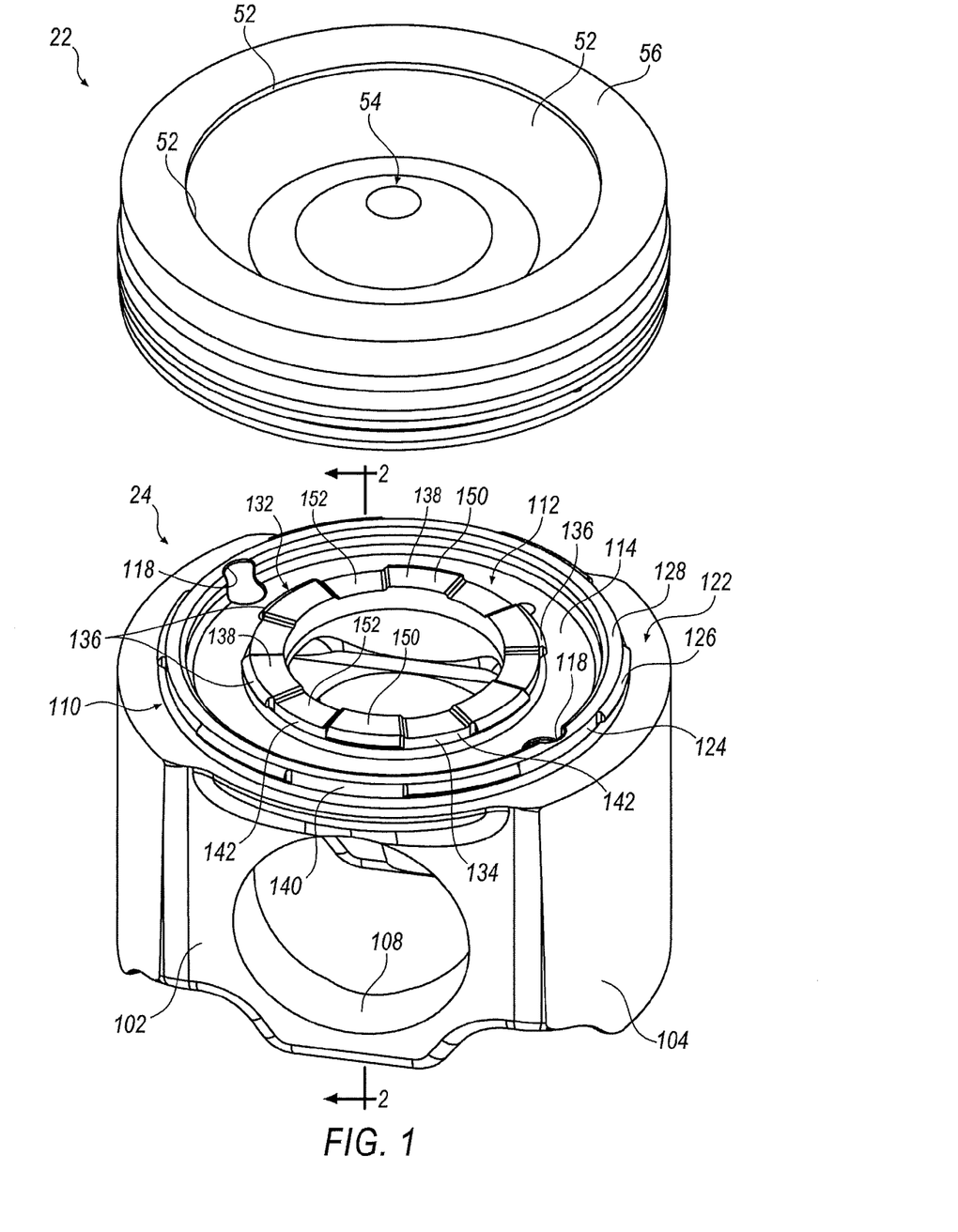
FIG. 1 is an exploded, perspective view of a piston, according to an embodiment.
Figure 2:
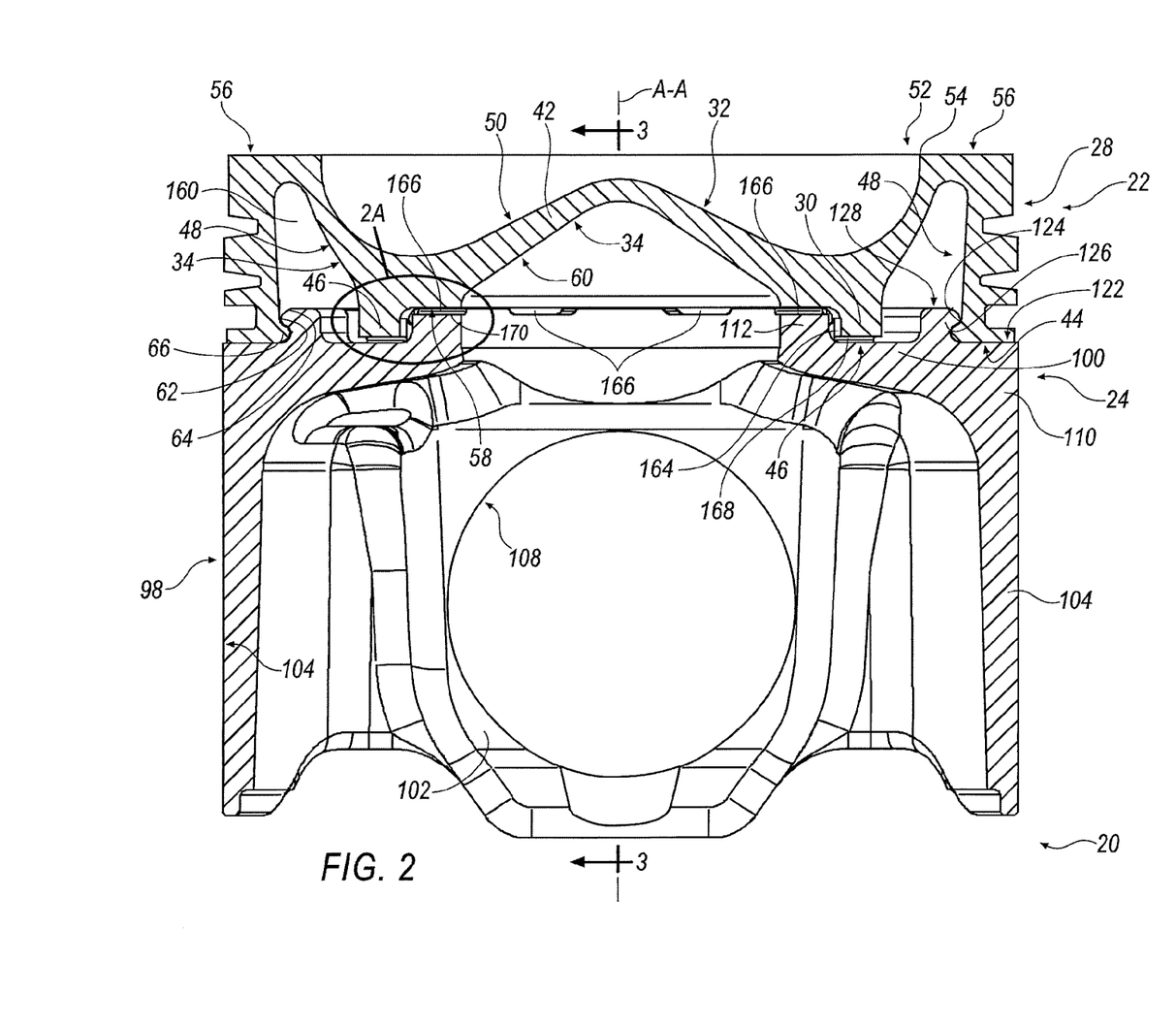
FIG. 2 is a partial cross section of the piston of FIG. 1, taken generally along line 2-2.
Figure 2A:
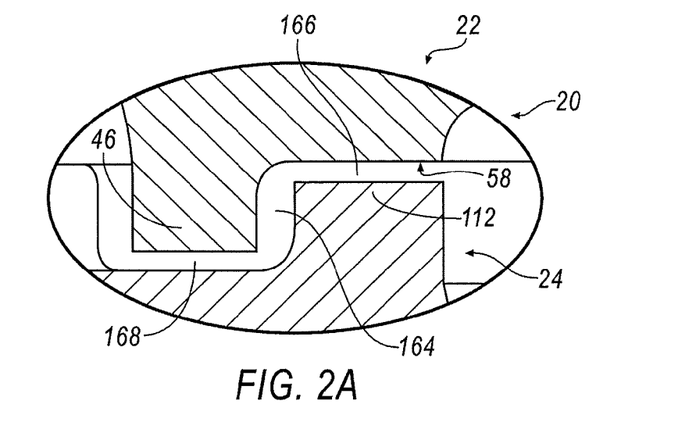
FIG. 2A is an enlarged view of portion 2A of FIG. 2.
Figure 3:
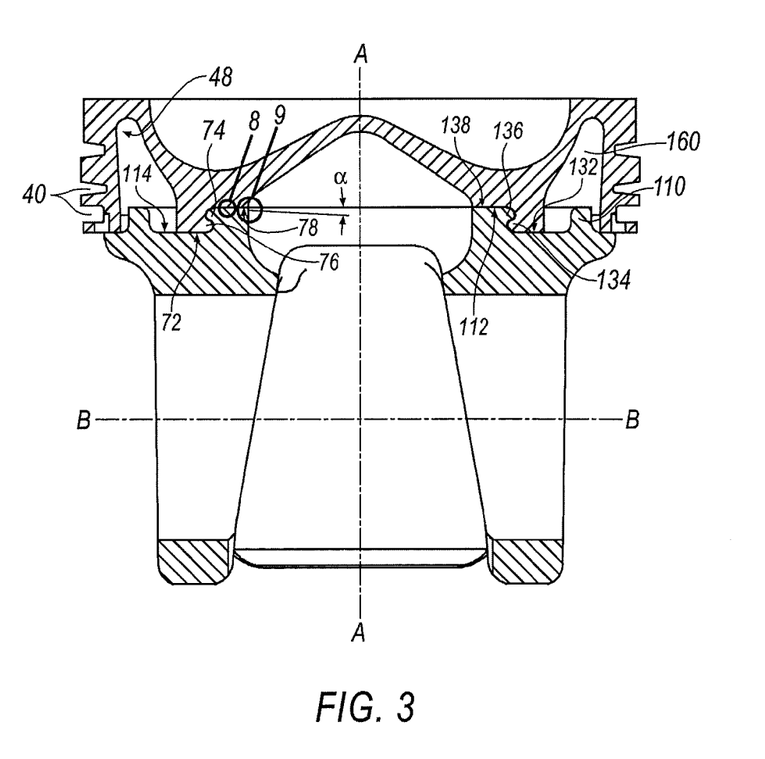
FIG. 3 is a partial cross section taken generally along line 3-3 of FIG. 2.

FIGS. 1-3 illustrate a piston 20. The piston 20 includes a crown 22 and a skirt 24. The crown 22 includes body 28 having a skirt connecting portion 30, a upper crown surface 32, a lower crown surface 34, and a crown side surface 36. In the embodiment illustrated, the crown 22 also includes a plurality of ring grooves 40 formed in the crown side surface 36 and a central dome portion 42. The crown side surface 36 may be circular, slightly generally oval, or other appropriate shape, as desired.

Figure 4:
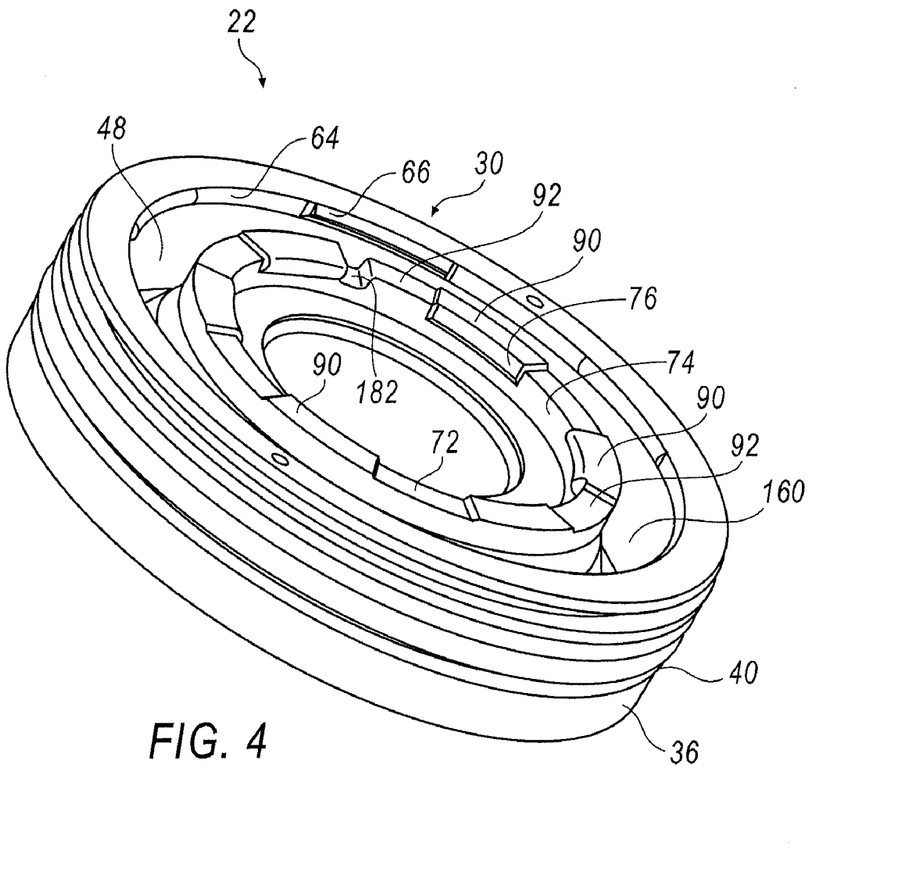
FIG. 4 is a perspective view of a portion of the piston of FIG. 1.
Figure 5:
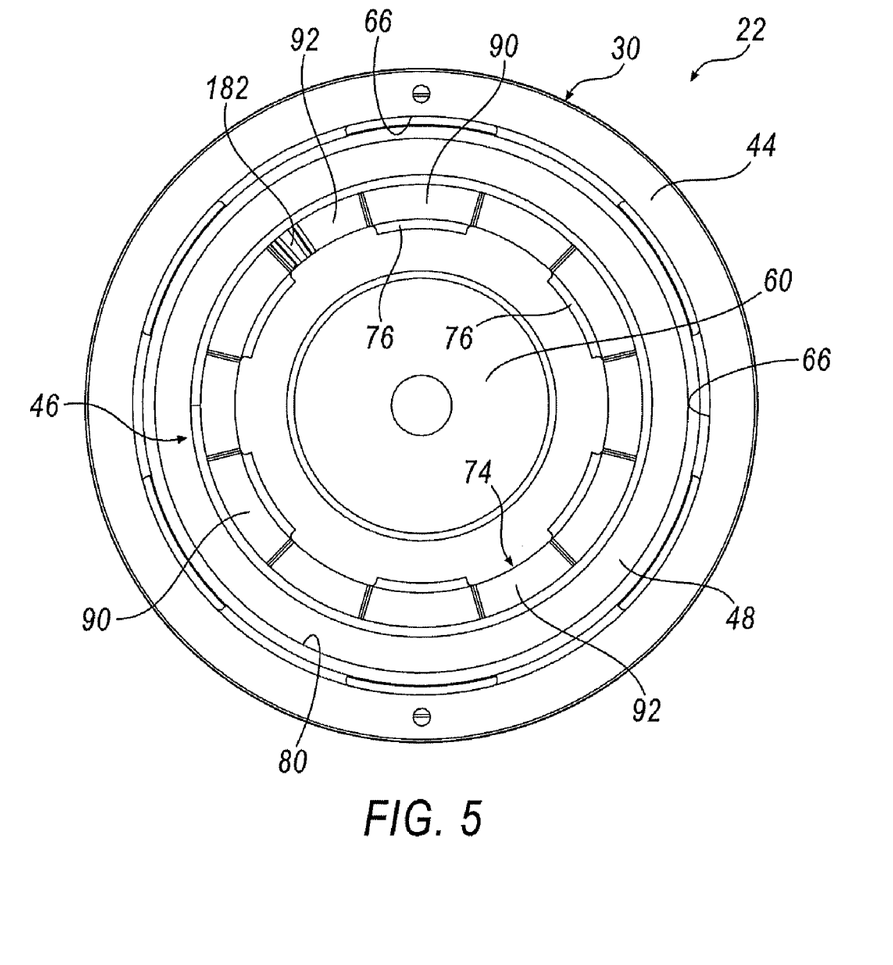
FIG. 5 is a bottom view of a portion of the piston of FIG. 1.
Figure 6:
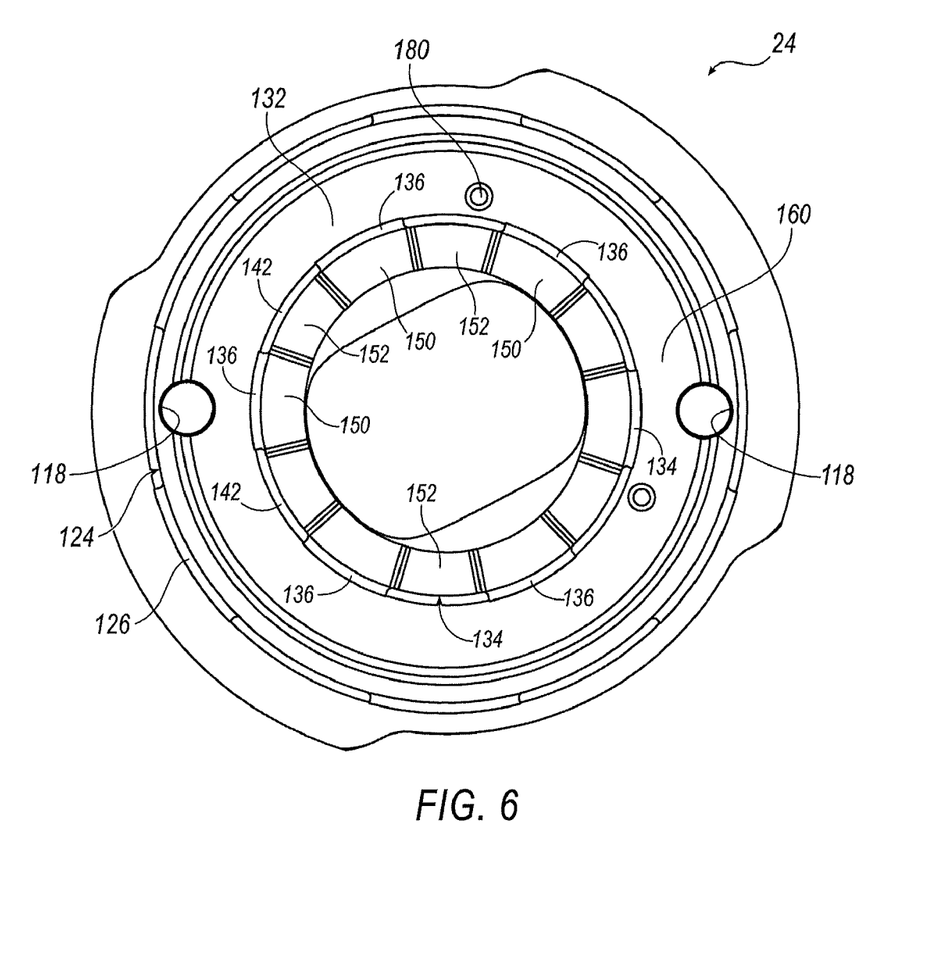
FIG. 6 is a top view of a portion of the piston of FIG. 1.

As best seen in FIGS. 2 and 3, the crown 22 is generally defined by an axis A-A. Referring to FIGS. 2-4, the skirt connecting portion 30 is defined, at least in part, by a first crown mating portion 44, a second crown mating portion 46 positioned radially relative to the axis A-A from the first crown mating portion 44, and a crown chamber surface 48 extending between the first crown mating portion 44 and the second crown mating portion 46.

The upper crown surface 32, as best seen in FIGS. 1-3, includes a central upper dome surface 50, an inner bowl edge portion 52 defining an inner bowl edge 54, and an upper top surface 56. As best seen in FIGS. 2-5, the lower crown surface 34 includes the first crown mating portion 44, the second crown mating portion 46, the crown chamber surface 48, a generally annular lower crown mating surface 58 and a central lower dome surface 60. The lower crown mating surface 58 extends between the central lower dome surface 60 and the second crown mating portion 46.

The first crown mating portion 44 includes a generally annular first crown seating surface 62, and a generally cylindrical first crown engaging surface 64 having a plurality of first crown protrusions 66 (FIGS. 2, 4, and 5) extending therefrom. The second crown mating portion 46 includes a generally annular second crown seating surface 72, a generally cylindrical second crown engaging surface 74 having a plurality of second crown protrusions 76 (FIGS. 3, 4, and 5) extending therefrom, and a generally annular second crown inner seating surface 78. In the embodiment illustrated, the first crown protrusions 66 and the second crown protrusions 76 extend generally toward the axis A-A from the surfaces 64, 74. As best seen in FIG. 4, the first crown mating portion 44 includes a plurality of first crown protrusions. In the exemplary illustration, six (6) first crown protrusions 66 are shown. The first crown protrusions 66 are illustrated as generally equally spaced and each extend circumferentially about the first crown engaging surface 64 about thirty (30) degrees. Therefore, a first crown engaging gap surface 80 is positioned between adjacent first crown protrusions 66, as discussed in greater detail below.

The second crown mating portion 46 includes a plurality of second crown protrusions. Again, merely by way of example, six second crown protrusions 76 are illustrated. The second crown protrusions 76 are illustrated generally equally spaced and each extend circumferentially about the second crown engaging surface 74 about thirty (30) degrees. Therefore, a second crown engaging gap surface 82 is positioned between adjacent second crown protrusions 76, as discussed in greater detail below. In the embodiment illustrated, and as best seen in FIG. 4, the second crown seating surface 72 includes a plurality of crown locking lugs, or crown raised portions, 90 and a plurality of crown recessed portions 92, as discussed in greater detail below.

As best seen in FIGS. 2 and 3, the skirt 24 is also generally defined by the axis A-A. The skirt 24 includes a skirt body 98, having a crown connecting portion 100, a pair of wrist pin connecting portions 102, and a pair of skirt wall portions 104 that interconnect the wrist pin connecting portions 102. Each wrist pin connecting portion 102 has a wrist pin aperture 108 formed therein with the wrist pin apertures 108 generally aligned along an axis B-B (FIG. 3).

As best seen in FIGS. 1-3, 6 and 7, the crown connecting portion 100 is defined, at least in part, by a first skirt mating portion 110, a second skirt mating portion 112, a skirt chamber surface 114 extending between the first skirt mating portion 110 and the second skirt mating portion 112, a skirt lower surface 116, and a pair of apertures 118 (FIG. 1) that extend through the crown connecting portion 100 from the skirt chamber surface 114 to the skirt lower surface 116.

Figure 7:
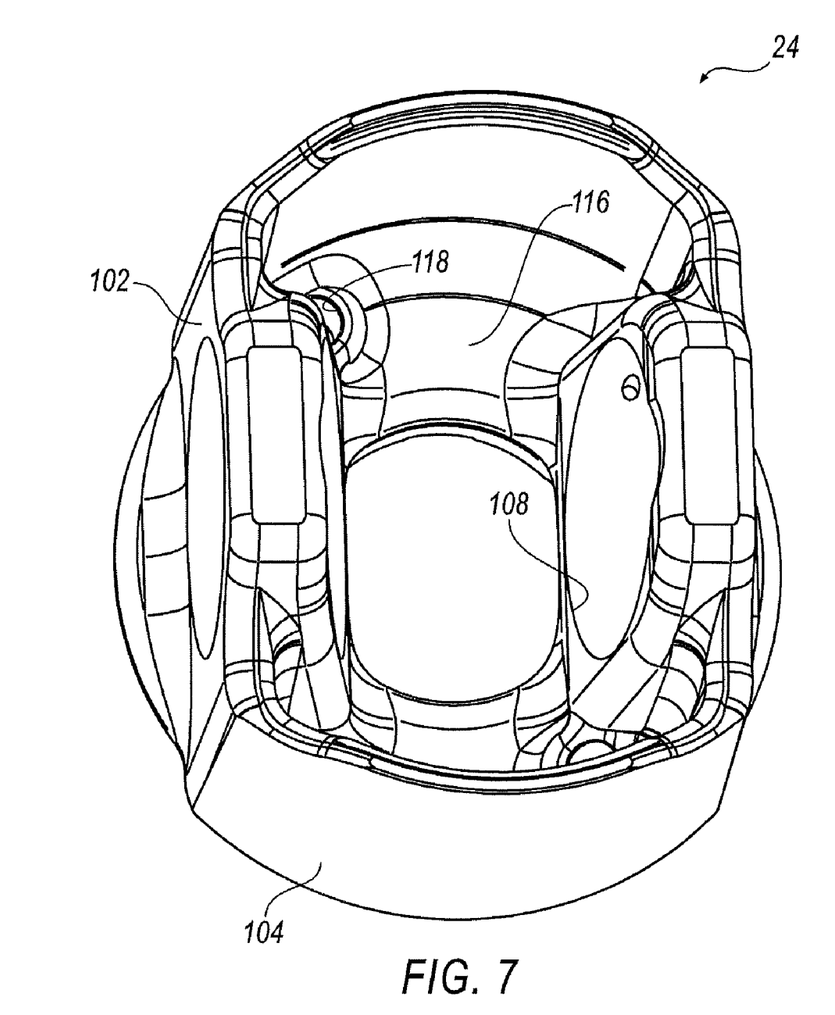
FIG. 7 is a bottom perspective view of a portion of the piston of FIG. 1.
Figure 8:
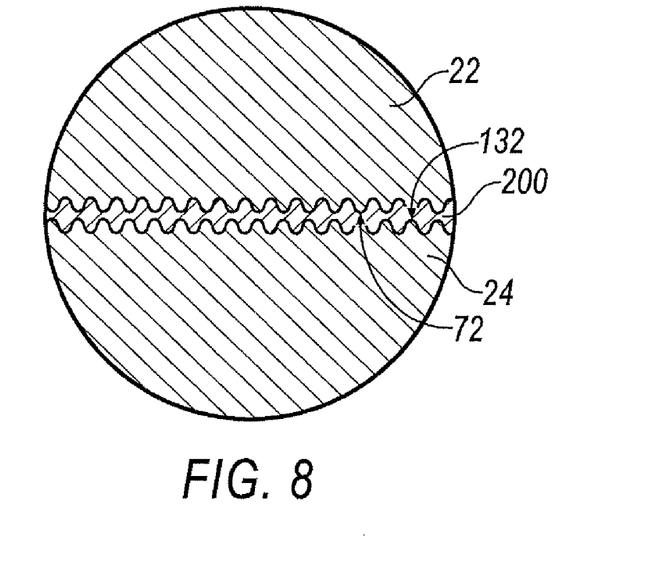
FIG. 8 is an enlarged view of portion 8 of FIG. 3.

The first skirt mating portion 110 includes a generally annular first skirt seating surface 122, a generally cylindrical first skirt engaging surface 124 having a plurality of first skirt protrusions 126 (FIGS. 1, 2, 6, and 7) extending therefrom, and a first skirt inner engaging surface 128. The second skirt mating portion 112 includes a generally annular second skirt seating surface 132, a generally cylindrical second skirt engaging surface 134 having a plurality of second skirt protrusions 136 (FIGS. 1, 3, 6, and 7) extending therefrom, and a generally annular second skirt inner seating surface 138. In the embodiment illustrated, the first skirt protrusions 126 and the second skirt protrusions 136 extend generally away from the axis A-A from the surfaces 124, 134. As best seen in FIGS. 1 and 7, the first skirt mating portion 110 includes a plurality of first skirt protrusions. By way of example, six first skirt protrusions 126 are shown. The first crown protrusions 126 are illustrated as being generally equally spaced and each extend circumferentially about the first skirt engaging surface 124 about thirty (30) degrees. Therefore, a first skirt engaging gap surface 140 is positioned between adjacent first skirt protrusions 126.

The second skirt mating portion 112 includes a plurality of second skirt protrusions. Six exemplary second skirt protrusions 136. The second skirt protrusions 136 are illustrated as being generally equally spaced and each extend circumferentially about the second skirt engaging surface 134 about thirty (30) degrees. Therefore, a second skirt engaging gap surface 142 is positioned between adjacent second skirt protrusions 136. In the embodiment illustrated, and as best seen in FIG. 1, the second skirt seating surface 132 includes a plurality of skirt locking lugs, or skirt raised portions, 150 and a plurality of skirt recessed portions 152.

As best seen in FIGS. 1 and 2, the skirt chamber surface 114 is generally defined by a radially outward first skirt chamber surface 154, a radially inward second chamber surface 156, and a generally radially extending lower skirt chamber surface 158.

The first crown mating portion 44 is selectively coupled to the first skirt mating portion 110, and the second crown mating portion 46 is selectively coupled to the second skirt mating portion 112, as discussed in greater detail below. The crown chamber surface 48 and the skirt chamber surface 114 define a cooling gallery, or piston chamber 160. The piston chamber 160, as best seen in FIGS. 2 and 3, is generally annular, and positioned between the crown 22 and the skirt 24. Oil or other materials may be circulated through the apertures 118 in order to extract heat from the crown 22 during operation of the piston 20.

Figure 9:
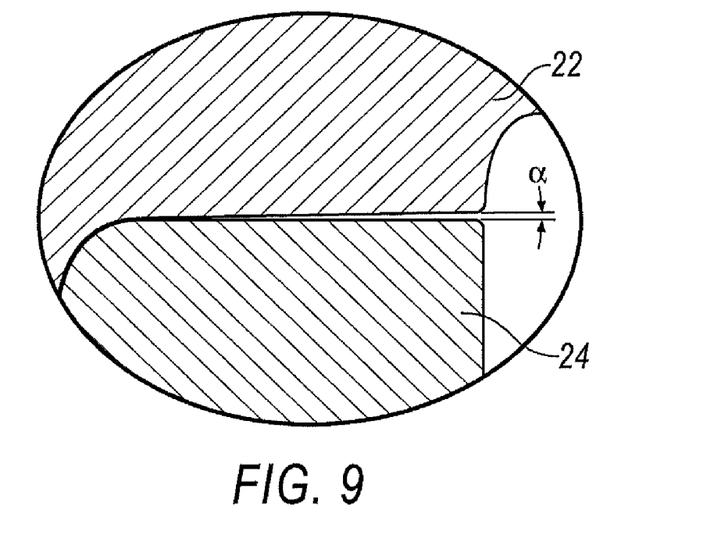
FIG. 9 is an enlarged view of portion 9 of FIG. 3.

As best seen in FIGS. 3 and 9, the second skirt inner seating surface 138 may be slightly frusto-conical as a portion of the second skirt inner seating surface 138 is positioned at an angle α relative to a plane that is perpendicular to the axis A-A, while the second crown inner seating surface 78 is generally defined by a plane that is generally perpendicular to the axis A-A. That is, the second skirt inner seating surface 138 (when viewed along a section taken parallel to the axis A-A, such as in FIGS. 3 and 9) may mate with the second crown inner seating surface 78 at an angle α. When the mating components are formed using a solid material, it is sometimes desirable that at least one of the second skirt inner seating surface 138 and the second crown inner seating surface is angled away from the other surface such that there is slight gap at the radially inward edge. Such a gap provides a relief to permit at least limited flexing while minimizing inadvertent flexing. Such a relief may not be required however, when at least one of the components and sometimes both components, are formed from a sintered material. In an embodiment the angle α may be less than one (1) degree, but greater than zero (0) degrees. In some circumstances a greater angle α may be appropriate.

In one embodiment of operation, a piston, such as the piston 20 is positioned within a cylinder of an engine, as is known. As the piston reciprocates within the cylinder, oil, or other cooling fluid, is sprayed into the apertures 118. The oil then "splashes" within the piston chamber 160, and on the crown chamber surface 48. In one embodiment, the oil entering the piston chamber 160 through the apertures 118 exits the piston chamber 160 through the apertures 118 at a controlled rate to retain a desirable amount of oil within the piston chamber 160 which may result in heating the oil within the piston chamber 160 and this heat removed from the piston chamber 160 as the oil exits.

To assemble the crown 22 and the skirt 24, the crown 22 and the skirt 24 may aligned generally as illustrated in FIG. 1, such that the first crown protrusions 66 align with the first skirt engaging gap surfaces 140, the second crown protrusions 76 align with the second skirt engaging gap surfaces 142, the first skirt protrusions 126 align with the first crown engaging gap surfaces 80, and the second skirt protrusions 136 align with the second crown engaging gap surfaces 82. The crown 22 and the skirt 24 are brought together as the first crown protrusions 66 are interposed within the first skirt engaging gap surfaces 140, the second crown protrusions 76 are interposed within the second skirt engaging gap surfaces 142, the first skirt protrusions 126 are interposed within the first crown engaging gap surfaces 80, and the second skirt protrusions 136 are interposed within the second crown engaging gap surfaces 82 until the surfaces 72, 132 are in contact.

Thus positioned, the crown raised portions 90 of the second crown seating surface 72 may be in contact with the lower skirt chamber surface 158, while the skirt raised portions 150 of the second skirt seating surface 132 may be in contact with the lower crown mating surface 58. The crown 22 and the skirt 24 may then be rotated or twisted relative one another generally about the axis A-A about thirty (30) degrees to a locked orientation where interference between the first crown protrusions 66 and the first skirt protrusions 126 inhibit axial movement of the crown 22 relative to the skirt 24. Further, interference between the second crown protrusions 76 and the second skirt protrusions 136 inhibit axial movement of the crown 22 relative to the skirt 24.

As best seen in FIG. 2, a gap 164 may exist between the second chamber surface 156 and the second crown engaging surface 74. A gap 166 may exist between a portion of the lower crown mating surface 58 and the facing skirt recessed portion 152. A gap 168 may exist between each crown recessed portion 92 and a portion of the lower skirt chamber surface 158. Oil may flow through the gaps 164, 166, 168, as discussed in greater detail below.

In another embodiment, the oil entering the piston chamber 160 through the apertures 118 does not exit the piston chamber 160 through the apertures 118, but may exit radially inward generally toward the piston axis A-A between the second skirt mating portion 112 and the second crown mating portion 46 (such as through the gaps 164, 166, 168). The flow rate of oil into and out of the piston chamber 160 may be selected such that a desirable amount of oil is contained within the piston chamber during operation of the engine to permit the oil to remove heat from the upper crown surface 32 of the piston 20.

The oil flow that exits (through the gaps 164, 166, 168) the piston chamber 160 may be controlled such that the oil is permitted to flow from the piston chamber 160 toward the axis A-A from a plurality of locations between the second skirt mating portion 112 and the second crown mating portion 46. That is, dimensions of the gaps 164, 166, and/or 168 may restrict the flow of oil to at least partially control the amount of oil present in the piston chamber 160 during operation. This flow of oil may avoid any "hot spots", or portions of the crown chamber surface 48 where the flow of oil past these portions of the crown chamber surface 48 is less than the flow of oil past other portions of the crown chamber surface 48. Specifically, the dimension of the gap 166 and/or 168 measured generally parallel to the axis A-A may be selected such that the oil flow therethrough is controlled to a desirable flow rate. In one illustrative embodiment, the dimension of the gap 166 may be 0.5 millimeters (mm), although this dimension may vary with desired flow rates.

In an exemplary illustration the crown 22 is constructed of a sintered metal, although other metal forming methods may be used. The inner bowl edge portion 52 may include ceramic portions interspersed within the metal powders prior to sintering to form an inner bowl edge portion that may withstand greater temperatures when compared to an inner bowl edge constructed of only sintered metal. Further, the inner bowl edge portion 52 may have a coating applied thereto to increase heat resistance. The skirt may be constructed of a sintered metal.

In the embodiment illustrated, a gasket portion 170 (FIGS. 2, 3, 10) is interposed between the second crown seating surface 72 and the second skirt seating surface 132. The gasket portion 170 may be copper, aluminum, or other suitable material for facilitating the sealing and/or locking the surfaces 72, 132, and/or 78, 138. That is, a material such as copper may be desirably interposed between the surfaces 72, 132, where the material will deform at least partially into the surface roughness of the surfaces 72, 132. Thus deformed, the material of the gasket portion 170, such as copper, may 'lock' the surface 72 to the surface 132 such that rotation of the crown 22 relative to the skirt 24 is inhibited. Similarly, a gasket portion may be interposed between any contacting surfaces of the crown 22 and the skirt 24.

Alternatively, it may be desirable to use a soldering, brazing or a welding process. For instance, at least one of the mating components may include a plurality of cavities or grooves that are filled with an appropriate solder, braze or other material having an appropriate melting temperature. The components and filler material are subjected to adequate heat in possible combination with other altered conditions such as modified atmospheric pressure to melt the filler material and secure the two components to one another. The resulting bond has high strength. Generally, the melting temperature and other environmental conditions used to promote bonding are selected to be distinct from that experienced during piston operation.

In an embodiment, FIG. 7 illustrates a spring loaded locking pin 180 extending from the second skirt seating surface 132 while FIG. 4 illustrates a locking pin groove 182 formed in the crown recessed portion 92. When aligned, the locking pin 180 may extend into the groove 182 to restrict rotation of the crown 22 relative to the skirt 24. In some cases it may be desirable to lock the spring loaded locking pin 180 to prevent the forces acting on the pin 180 from moving the pin 180 relative to the piston 20 during reciprocation of the piston 20. FIG. 9 illustrates the crown 22 without a locking pin groove 182, while FIG. 1 illustrates the skirt 24 without a locking pin 180.

In one embodiment of assembly of the piston 20, the crown 22 and the skirt 24 may be forged, machined, and then shrink fit. For a shrink fit, the crown is heated, or the skirt is cooled, or some combination of both and then the crown and skirt are assembled as in FIG. 2, and permitted to thermally stabilize. After thermal stabilization (usually at room temperature), the skirt and crown are in an interference fit. This interference fit may be used with or without the locking pin 180 to secure the crown 22 to the skirt 24.

In another embodiment of assembly, the skirt 24 may be forged or sintered of powered metal, and the crown 22 may be constructed of powered metal and presintered. The crown 22 and the skirt 24 may then be machined, as desired. The crown 22 and the skirt 24 may then be assembled as in FIG. 2, and then the piston 20 heated such that the crown 22 undergoes a final sintering. For a pre-sinter, the crown 22 may be heated to a sintering temperature for a period of time that results in a partially sintered component. During the final sintering, the crown 22 may shrink sufficiently to provide a desirable shrink fit.

Figure 10:
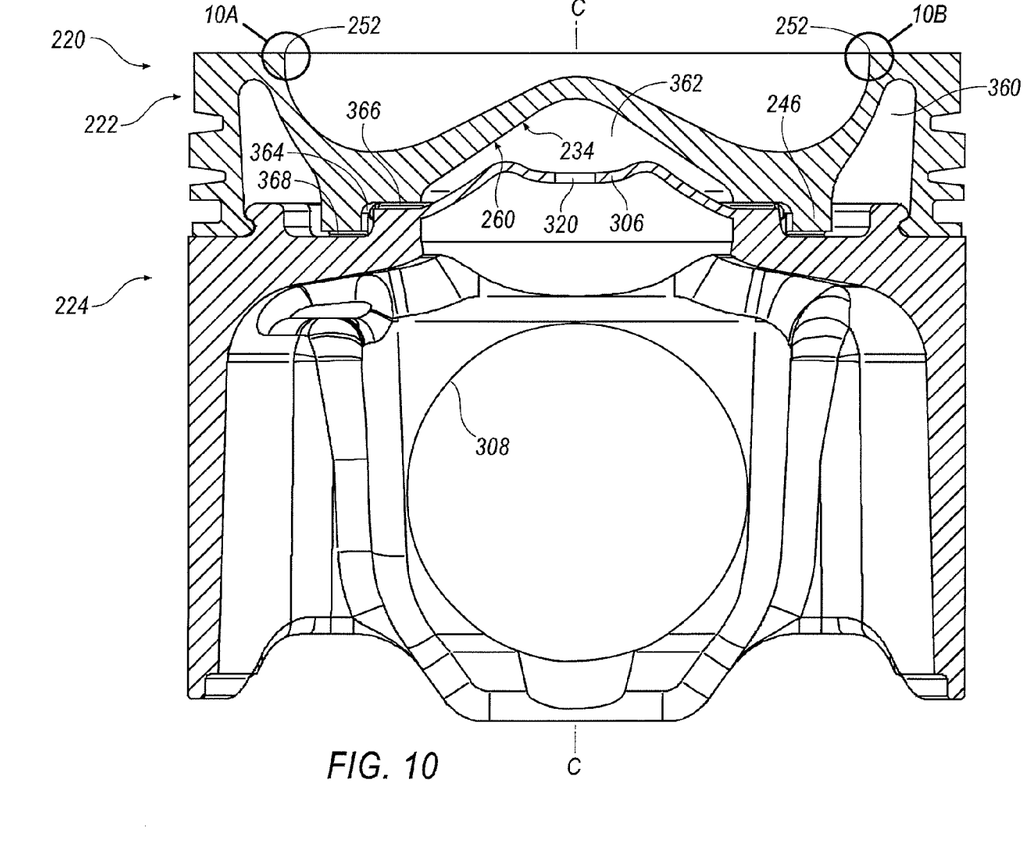
FIG. 10 is a partial sectional view of a piston according to an embodiment.
Figure 11:
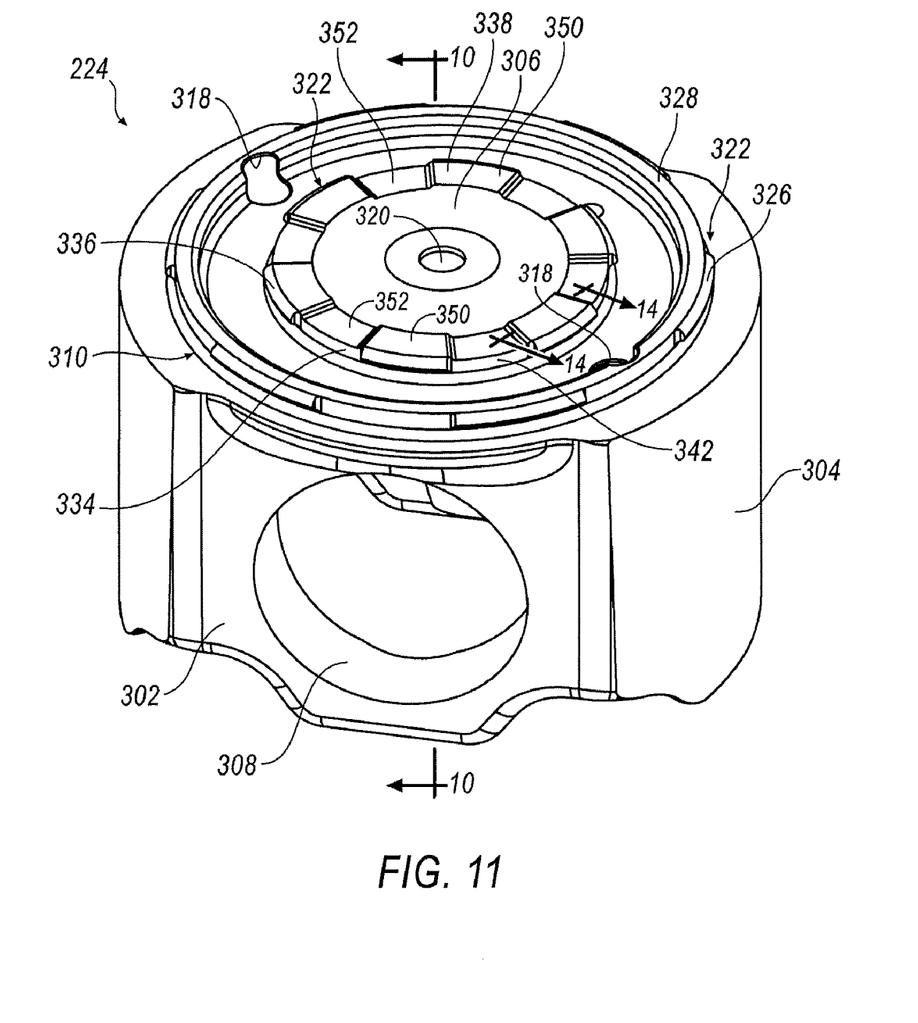
FIG. 11 is a perspective view of a portion of the piston of FIG. 10.
Figure 12:
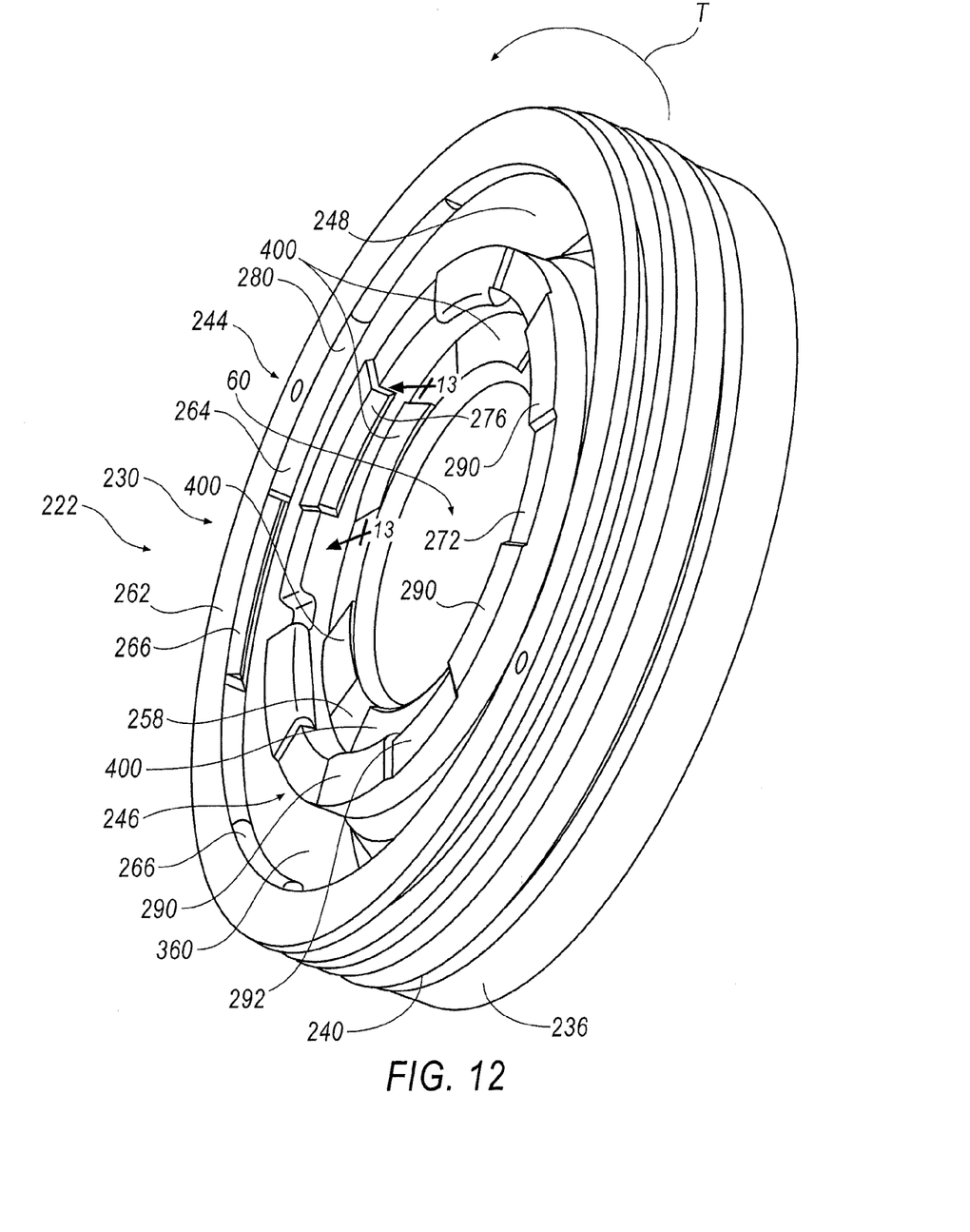
FIG. 12 is a perspective view of a portion of the piston of FIG. 10.

FIGS. 10-12 illustrate an alternative embodiment of the piston 20 as a piston 220. The piston 220 includes a crown 222 and a skirt 224. The crown 222 includes body 228 having a skirt connecting portion 330, a upper crown surface 332, a lower crown surface 334, and a crown side surface 336. In the embodiment illustrated, the crown 222 also includes a plurality of ring grooves 240 formed in the crown side surface 336 and a central dome portion 242. The crown side surface 336 may be circular, slightly generally oval, or other appropriate shape, as desired.

The crown 222 is generally defined by an axis C-C. The skirt connecting portion 330 is defined, at least in part, by a first crown mating portion 244, a second crown mating portion 246 positioned radially relative to the axis C-C from the first crown mating portion 244, and a crown chamber surface 248 extending between the first crown mating portion 244 and the second crown mating portion 246.

The upper crown surface 332 includes a central upper dome surface 250, an inner bowl edge portion 252 defining an inner bowl edge 254, an upper top surface 256, and a lower crown mating surface 258. In the embodiment illustrated, the lower crown mating surface 258 is generally planar and perpendicular to the axis C-C. The lower crown surface 334 includes the first crown mating portion 244, the second crown mating portion 246, the crown chamber surface 248, and a central lower dome surface 260.

The first crown mating portion 244 includes a generally annular first crown seating surface 262, and a generally cylindrical first crown engaging surface 264 having a plurality of first crown protrusions 266 extending therefrom. The second crown mating portion 246 includes a generally annular second crown seating surface 272, a generally cylindrical second crown engaging surface 274 having a plurality of second crown protrusions 276 extending therefrom, and a generally annular second crown inner seating surface 278. In the embodiment illustrated, the first crown protrusions 266 and the second crown protrusions 276 extend generally toward the axis C-C from the surfaces 264, 274. As best seen in FIG. 12, the first crown mating portion 244 includes a plurality of first crown protrusions 266. In the exemplary illustration six first crown protrusions 266 are shown. The first crown protrusions 266 are generally equally spaced and each extend circumferentially about the first crown engaging surface 264 about thirty (30) degrees. Therefore, a first crown engaging gap surface 280 is positioned between adjacent first crown protrusions 266, as discussed in greater detail below.

The second crown mating portion 246 includes a plurality of second crown protrusions 276. In the figure six second protrusions 276 are shown. The second crown protrusions 276 are generally equally spaced and each extend circumferentially about the second crown engaging surface 274 about thirty (30) degrees. Therefore, a second crown engaging gap surface 282 is positioned between adjacent second crown protrusions 276, as discussed in greater detail below. In the exemplary illustration the second crown seating surface 272 includes a plurality of crown locking lugs, or crown raised portions, 290 and a plurality of crown recessed portions 292, as discussed in greater detail below.

The skirt 224 is also generally defined by the axis C-C. The skirt 224 includes a skirt body 298, having a crown connecting portion 300, a pair of wrist pin connecting portions 302, a pair of skirt wall portions 304 that interconnect the wrist pin connecting portions 302, and a skirt web 306. Each wrist pin connecting portion 302 has a wrist pin aperture 308 formed therein with the wrist pin apertures 308 (FIG. 11).

The crown connecting portion 300 is defined, at least in part, by a first skirt mating portion 310, a second skirt mating portion 312, a skirt chamber surface 314 extending between the first skirt mating portion 310 and the second skirt mating portion 312, a skirt lower surface 316, and a pair of apertures 318 that extend through the crown connecting portion 300 from the skirt chamber surface 314 to the skirt lower surface 316. The second skirt mating portion 312 generally encircles the skirt web 306. The skirt web 306 includes a skirt web aperture 320, as discussed in greater detail below.

The first skirt mating portion 310 includes a generally annular first skirt seating surface 322, a generally cylindrical first skirt engaging surface 324 having a plurality of first skirt protrusions 326 extending therefrom, and a first skirt inner engaging surface 328. The second skirt mating portion 312 includes a generally annular second skirt seating surface 332, a generally cylindrical second skirt engaging surface 334 having a plurality of second skirt protrusions 336 extending therefrom, and a generally annular second skirt inner seating surface 338. In the embodiment illustrated, the first skirt protrusions 326 and the second skirt protrusions 336 extend generally away from the axis C-C from the surfaces 324, 334. The first skirt mating portion 310 includes a plurality of first skirt protrusions 326. In the exemplary illustration six first skirt protrusions 326 are shown. The first crown protrusions 326 are generally equally spaced and each extend circumferentially about the first skirt engaging surface 324 about thirty (30) degrees. Therefore, a first skirt engaging gap surface 340 is positioned between adjacent first skirt protrusions 326.

The second skirt mating portion 312 includes a plurality of second skirt protrusions 336. While six second skirt protrusions 336 are illustrated, any appropriate number of skirt protrusions 336 may be used. The second skirt protrusions 336 are generally equally spaced and each extend circumferentially about the second skirt engaging surface 334 about thirty (30) degrees. Therefore, a second skirt engaging gap surface 342 is positioned between adjacent second skirt protrusions 336. In the embodiment illustrated, the second skirt seating surface 332 includes a plurality of skirt locking lugs, or skirt raised portions, 350 and a plurality of skirt recessed portions 352.

The first crown mating portion 244 is selectively coupled to the first skirt mating portion 310, and the second crown mating portion 246 is selectively coupled to the second skirt mating portion 312, as discussed in greater detail below. The crown chamber surface 248 and the skirt chamber surface 314 define a cooling gallery, or piston chamber 360. The piston chamber 360 is generally annular, and positioned between the crown 222 and the skirt 224. The lower dome surface 260 and the skirt web 306 define an inner cooling gallery, or inner piston chamber 362.

Oil or other materials may be circulated through the apertures 318 and the skirt web aperture 320 in order to extract heat from the crown 222 during operation of the piston 220. In one embodiment, oil is introduced into at least one of the apertures 318, at least partially fills the piston chamber 360, then flows through the passageway 374 from the piston chamber 360 to the inner piston chamber 362, at least partially fills the inner piston chamber 362, then flows through the skirt web aperture 320. In this embodiment, the oil that flows through the chambers 360, 362 may extract heat from the piston 220.

The second skirt inner seating surface 338 may be slightly frusto-conical as a portion of the second skirt inner seating surface 338 is positioned at an angle $\alpha$ relative to a plane that is perpendicular to the axis C-C, while the second crown inner seating surface 278 is generally defined by a plane that is perpendicular to the axis C-C. That is, the second skirt inner seating surface 338 may mate with the second crown inner seating surface 278 at an angle $\alpha$. In an embodiment, the angle $\alpha$ may be less than approximately one (1) degree while greater than zero (0) degrees. In some circumstances a greater angle $\alpha$ may be appropriate.

To assemble the crown 222 and the skirt 224, the crown 222 and the skirt 224 may aligned such that the first crown protrusions 266 align with the first skirt engaging gap surfaces 340, the second crown protrusions 276 align with the second skirt engaging gap surfaces 342, the first skirt protrusions 326 align with the first crown engaging gap surfaces 280, and the second skirt protrusions 336 align with the second crown engaging gap surfaces 282. The crown 222 and the skirt 224 are brought together as the first crown protrusions 266 are interposed within the first skirt engaging gap surfaces 340, the second crown protrusions 276 are interposed within the second skirt engaging gap surfaces 342, the first skirt protrusions 326 are interposed within the first crown engaging gap surfaces 280, and the second skirt protrusions 336 are interposed within the second crown engaging gap surfaces 282 until the surfaces 272, 332 are in contact.

Thus positioned, the crown raised portions 290 of the second crown seating surface 272 may be in contact with the lower skirt chamber surface 358, while the skirt raised portions 350 of the second skirt seating surface 332 may be in contact with the lower crown mating surface 258. The crown 222 and the skirt 224 may then be rotated or twisted relative one another generally about the axis A-A about thirty (30) degrees to a locked orientation where interference between the first crown protrusions 266 and the first skirt protrusions 326 inhibit axial movement of the crown 222 relative to the skirt 224. In one embodiment, the crown 222 is rotated generally in the rotational direction T (FIG. 12) as the crown 224 remains relatively stationary. Further, interference between the second crown protrusions 276 and the second skirt protrusions 336 inhibit axial movement of the crown 222 relative to the skirt 224.

As best seen in FIG. 10, a gap 364 may exist between the second chamber surface 356 and the second crown engaging surface 274. A gap 366 may exist between a portion of the lower crown mating surface 258 and the facing skirt recessed portion 352. A gap 368 may exist between each crown recessed portion 292 and a portion of the lower skirt chamber surface 358. Oil may flow through the gaps 364, 366, 368, as discussed in greater detail below.

Figure 10A:
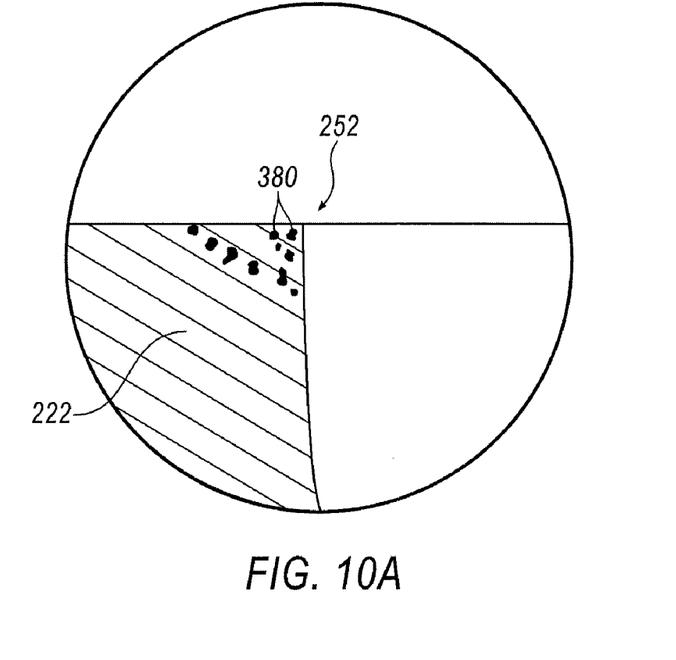
FIG. 10A is an enlarged view of portion 10A of FIG. 10.
Figure 10B:
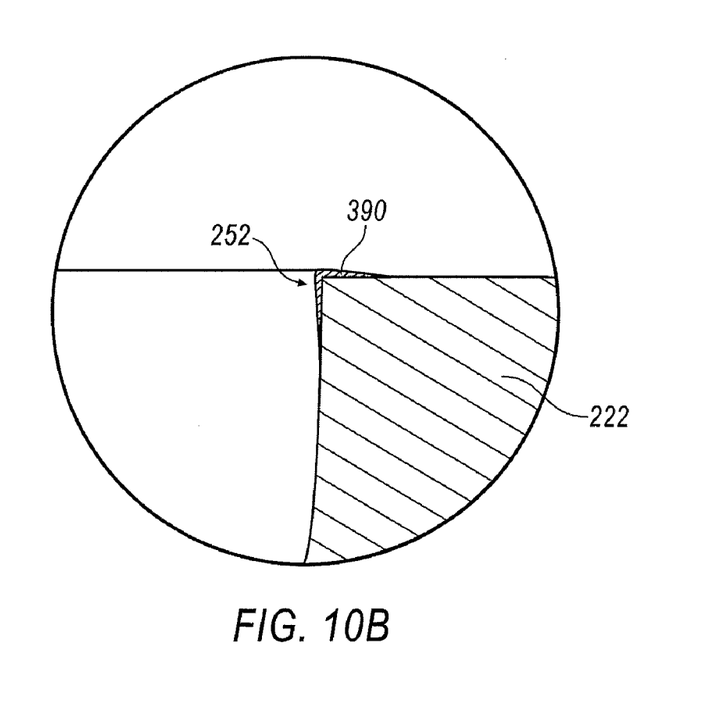
FIG. 10B is an enlarged view of portion 10B of FIG. 10.

In the embodiment illustrated, the crown 222 is constructed of a sintered metal, although other metal forming methods may be used. The inner bowl edge portion 252 may include ceramic portions 380 (FIG. 10A) interspersed within the metal powders prior to sintering to form an inner bowl edge portion that may withstand greater temperatures when compared to an inner bowl edge constructed of only sintered metal. Further, the inner bowl edge 252 may have a coating 390 (FIG. 10B) applied thereto to increase heat resistance. The skirt 224 may be constructed of a sintered metal or forged.

When using sintered materials it may be possible to use the sintering to promote bonding of the constituent parts, particularly when both the skirt and the crown are formed predominantly from a sintered material such as a sintered metal. In particular, a sintering process may be used to accomplish an expansion fit or a shrink fit of the skirt and the crown. That is, the contacting surfaces of the skirt and the crown may tend to flow into the voids therebetween when heated to a sintering temperature.

Figure 13:
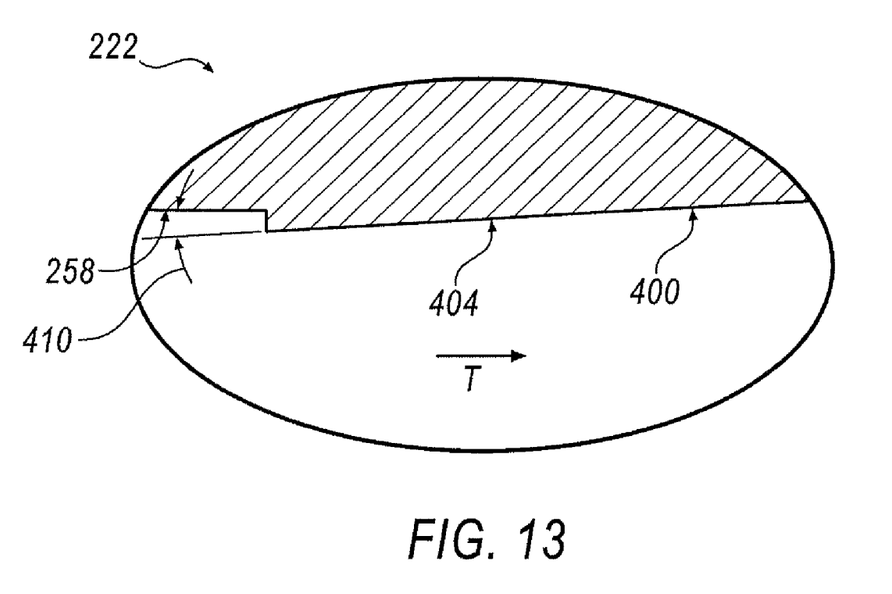
FIG. 13 a partial cross section taken generally along line 13-13 of FIG. 12.
Figure 14:
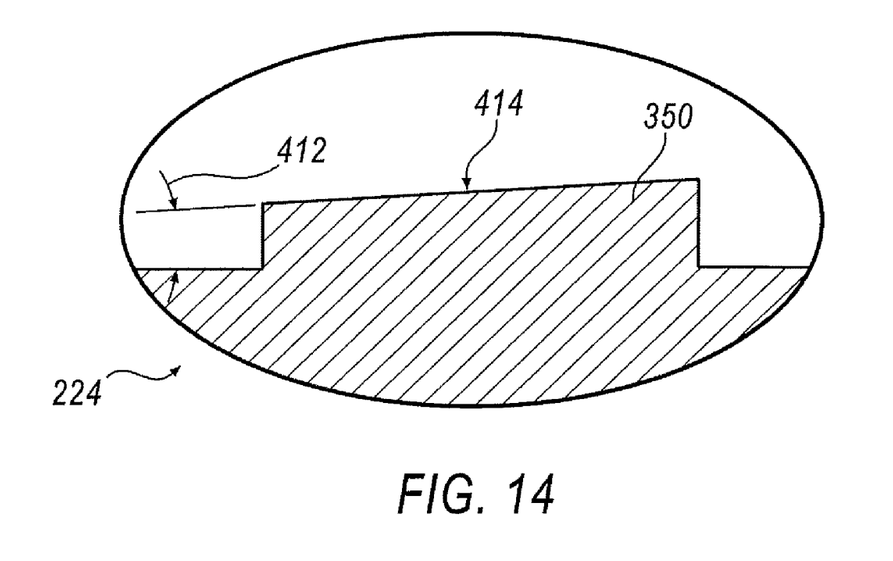
FIG. 14 a partial cross section taken generally along line 14-14 of FIG. 11.

Additionally, the lower crown mating surface 258 may include a plurality of ramps 400 (FIGS. 12 and 13) that contact the skirt raised portions 350 during assembly of the piston 220. As best seen in FIG. 13, each ramp 400 includes a surface 404 that is generally orientated at a ramp angle 410 relative to a plane that is perpendicular to the axis C-C. FIG. 14 illustrates an embodiment of the skirt raised portions 350 having a skirt surface 414 that is generally orientated at an angle 412 relative to a plane that is perpendicular to the axis C-C. FIGS. 13 and 14 are both taken from a central portion of the piston 220 when viewed radially outward from the axis C-C. During assembly, the surface 404 contacts the surface 414 when the crown 222 and the skirt 224 are brought together generally along the axis C-C. Then, as the crown 222 is rotated in the rotational direction T relative to the skirt 224, the interference between the surface 404 and the surface 414 (which is opposed by the interference by the protrusions 266, 326, and 276, 336. This 'tightening' of the crown 222 to the skirt 224 may ensure a fitting of the skirt 222 and the crown 224 to resist relative movement therebetween during operation of the piston 220.

In another embodiment, both the crown 22 and the skirt 24 may be constructed of a forged material. When both the crown 22 and the skirt 24 are forged, an expansion fit in a finishing sintering step is not performed, while the interference between the crown raised portions 90 and the skirt raised portions 150 inhibit relative rotation between the crown 22 and the skirt 24.

To reduce fretting, the angle α of the second skirt seating surface 132 relative to the second crown seating surface 72 may be greater than zero degrees. That is, the angle α may be less than one (1) degree and may be less than about fifty (50) minutes in order to reduce the surface pressures on portions of the contacting surfaces between the surfaces 78, 138, or other contacting surfaces where an angle is provided. Additionally, the crown 22 may be at least partially sintered to the skirt 24, as described above, or partially sintered with a gasket, such as the gasket portion 170 interposed therebetween.

Although the steps of a disclosed approach of making the piston 20, 220 may be listed in an embodiment of an order for performing the steps, the steps may be performed in differing orders or combined such that one operation may perform multiple steps or multiple steps may be performed at least partially concurrently. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A piston comprising:
a crown portion generally defining an axis and having a skirt connecting portion, the skirt connecting portion defined, at least in part, by a first crown mating portion, a second crown mating portion positioned radially from the first crown mating portion, and a crown chamber surface extending between the first crown mating portion and the second crown mating portion; and
a skirt having a crown connecting portion, the crown connecting portion defined, at least in part, by a first skirt mating portion, a second skirt mating portion, and a skirt chamber surface extending between the first skirt mating portion and the second skirt mating portion, wherein the first crown mating portion is selectively coupled to the first skirt mating portion, the second crown mating portion is selectively coupled to the second skirt mating portion to define a piston chamber that is defined, at least in part, by the crown chamber surface and the skirt chamber surface;
wherein the first crown mating portion is defined, at least in part, by a plurality of generally radially extending first crown protrusions, the first skirt mating portion is defined, at least in part, by a plurality of generally radially extending first skirt protrusions, and wherein interference between the first crown protrusions and the first skirt protrusions inhibit axial movement of the crown portion relative to the skirt portion;
wherein the second crown mating portion is defined, at least in part, by a plurality of generally radially extending second crown protrusions, the second skirt mating portion is defined, at least in part, by a plurality of generally radially extending second skirt protrusions, and wherein interference between the second crown protrusions and the second skirt protrusions inhibit axial movement of the crown portion relative to the skirt portion; and wherein the second crown mating portion and the second skirt mating portion are engaged to substantially prevent relative rotation between the second crown mating portion and the second skirt mating portion, thereby substantially preventing disengagement of the second crown mating portion and the second skirt mating portion;

wherein the engagement of the second crown mating portion and the second skirt mating portion includes a sintering of the second crown mating portion to the second skirt mating portion.

2. The piston of claim 1, further comprising an aperture formed in the skirt, wherein the aperture interconnects the piston chamber with a lower surface of the skirt to permit a cooling fluid to pass therethrough.

3. The piston of claim 1, wherein the crown chamber surface is a generally annular surface radially spaced from a central lower dome surface.

4. The piston of claim 3, further comprising a second piston chamber at least partially defined by the central lower dome surface located radially inward of the piston chamber, and a second piston chamber aperture in fluid communication with the second piston chamber.

5. The piston of claim 4, wherein the piston chamber is in fluid communication with the second piston chamber.

6. The piston of claim 5, further comprising at least one aperture formed in the skirt chamber surface for permitting oil to enter the piston chamber.

7. The piston of claim 1, wherein the engagement of the second crown mating portion and the second skirt mating portion includes a shrink fit interference between the second crown mating portion and the second skirt mating portion.

8. The piston of claim 1, wherein the engagement of the second crown mating portion and the second skirt mating portion includes at least one crown ramp and at least one skirt ramp, the crown and skirt ramps each defining ramp surfaces extending axially such that relative rotation between the crown and skirt increases an interference between the crown and skirt ramps.

9. A piston comprising:
   a crown portion generally defining an axis and having a skirt connecting portion, the skirt connecting portion defined, at least in part, by a first crown mating portion, a second crown mating portion positioned radially from the first crown mating portion, and a crown chamber surface extending between the first crown mating portion and the second crown mating portion, wherein the first crown mating portion is defined, at least in part, by a plurality of generally radially extending first crown protrusions; and
   a skirt having a crown connecting portion, the crown connecting portion defined, at least in part, by a first skirt mating portion, a second skirt mating portion, and a skirt chamber surface extending between the first skirt mating portion and the second skirt mating portion, wherein the first crown mating portion is selectively coupled to the first skirt mating portion, the second crown mating portion is selectively coupled to the second skirt mating portion, wherein the first skirt mating portion is defined, at least in part, by a plurality of generally radially extending first skirt protrusions, and wherein interference between the first crown protrusions and the first skirt protrusions inhibit axial movement of the crown portion relative to the skirt portion;

wherein the second crown mating portion is defined, at least in part, by a plurality of generally radially extending second crown protrusions, the second skirt mating portion is defined, at least in part, by a plurality of generally radially extending second skirt protrusions, and wherein interference between the second crown protrusions and the second skirt protrusions inhibit axial movement of the crown portion relative to the skirt portion; and wherein the second crown mating portion and the second skirt mating portion are engaged to substantially prevent relative rotation between the second crown mating portion and the second skirt mating portion, thereby substantially preventing disengagement of the second crown mating portion from the second skirt mating portion;

wherein the engagement of the second crown mating portion and the second skirt mating portion includes a shrink fit interference between the second crown mating portion and the second skirt mating portion.

10. The piston of claim 9, further comprising an aperture formed in the skirt, wherein the aperture interconnects a piston chamber with a lower surface of the skirt to permit a cooling fluid to pass therethrough, the piston chamber defined, at least in part, by the crown chamber surface and the skirt chamber surface.

11. The piston of claim 9, wherein the crown chamber surface is a generally annular surface generally surrounding a central lower dome surface.

12. The piston of claim 9, further comprising at least one aperture formed in the skirt chamber surface for permitting oil to enter a piston chamber, the piston chamber defined, at least in part, by the crown chamber surface and the skirt chamber surface.

13. The piston of claim 9, wherein the second crown mating portion is positioned radially inward of the first crown mating portion.

14. The piston of claim 9, further comprising an aperture at least partially interposed between a portion of the second crown mating portion and a portion of the second skirt mating portion.

15. The piston of claim 9, wherein the engagement of the second crown mating portion and the second skirt mating portion includes a gasket interposed between and at least partially deformed by the second crown mating portion and the second skirt mating portion.

16. The piston of claim 9, wherein the engagement of the second crown mating portion and the second skirt mating portion includes a locking pin extending from one of the second crown mating portion and the second skirt mating portion to the other of the second crown mating portion and the second skirt mating portion.

17. The piston of claim 9, wherein the engagement of the second crown mating portion and the second skirt mating portion includes a sintering of the second crown mating portion to the second skirt mating portion.

18. The piston of claim 9, wherein the engagement of the second crown mating portion and the second skirt mating portion includes at least one crown ramp and at least one skirt ramp, the crown and skirt ramps each defining ramp surfaces extending axially such that relative rotation between the crown and skirt increases an interference between the crown and skirt ramps.

* * * * *